March 7, 1967 T. V. WILLIAMS 3,307,254
CUTTING AND BURNISHING TOOL
Filed April 5, 1965

INVENTOR.
Thurston V. Williams
BY
Roberts, Cushman & Grover
ATT'YS 3,307,254
CUTTING AND BURNISHING TOOL
Thurston V. Williams, Wilton, N.H., assignor to The
O.K. Tool Company, Inc., Milford, N.H., a corporation of New Hampshire
Filed Apr. 5, 1965, Ser. No. 445,615
4 Claims. (Cl. 29—567)

The present invention relates to rotary machine tools and more particularly to those tools which simultaneously cut and burnish a metal work surface.

The principal object of the present invention is to provide a rotary machine tool for general application that can perform the steps of cutting and burnishing a metal work surface in one operation. Other objects are to provide a cutting and burnishing machine tool which admits to a wide range of application, which is of simple yet durable construction, and which is economical to both manufacture and use.

In one aspect the present invention involves a rotary cutting tool that comprises a cutter head which has a circular face and mounting means. Secured in the head and projecting from the face thereof are at least two radially disposed cutter blades which define a circular cutting path. Following each blade in the cutting path is a radially disposed burnishing roller which similarly is secured in the head and projects from the face thereof. Each blade and roller is radially disposed in that each blade face and each roller axis extend approximately along a radial plane.

Preferably the tool has the following characteristics. Each of the rollers is spring mounted in the cutter head and each roller is tapered and has its narrowed end toward the axis of the cutter head. Following each cutter blade in the cutting path but preceding the roller that follows the said blade is a brush which extends from the face of the cutter head. Each brush is obliquely disposed in the cutting path, that is, the longitudinal axis of each brush is set at an angle to a radius of the cutter head.

Figure 1:
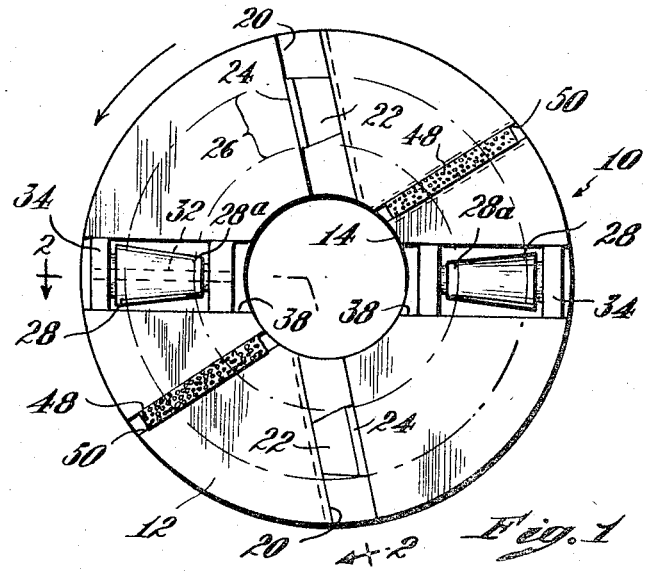
Figure 2:
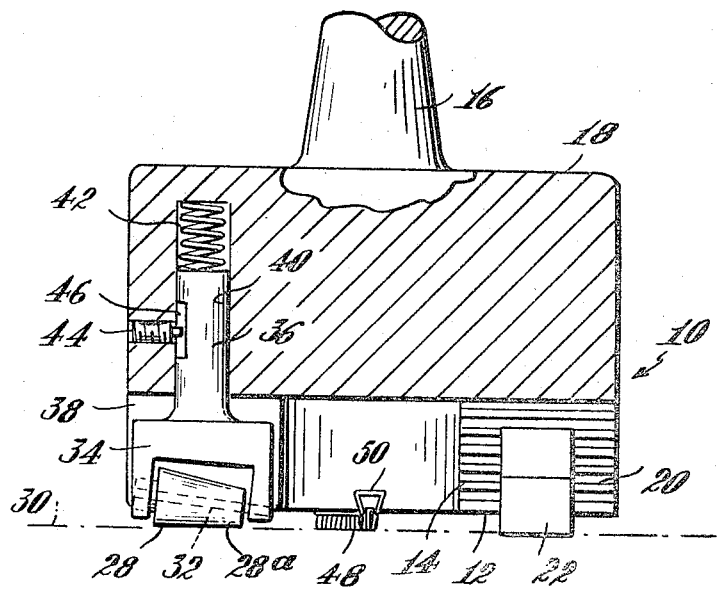

For the purpose of illustration a typical embodiment of the invention is shown in the accompanying drawing in which FIG. 1 is a plan view of the face of the present invention; and FIG. 2 is a section on line 2—2 of FIG. 1.

In the particular embodiment of the invention chosen for the purpose of illustration the rotary cutting tool comprises a cutter head 10 which has a circular face 12 with an axial recess 14 therein and axial mounting means consisting of a tapered shank 16 extending from the opposite face 18 of the head 10. Two grooved slots 20 in the face 12 of the head 10 each receive and secure a cutter blade 22. The blade face 24 of each blade 22 lies in a radial plane of the cutter head 10 and projects from the circular face 12, whereby rotation of the cutter tool causes the blades 22 to define a circular cutting path 26 which is shown in dashed manner in FIG. 1.

Following each blade 22 in the cutting path 26 is a burnishing roller 28 that is tapered and has its narrowed end 28a toward the axis of the cutter head 10. The axis of each roller 28 extends along a radius of the cutter head 10 and is inclined with respect to the plane of a work surface 30. A shaft 32 through the roller 28 is journaled in a yoke 34 that has a shank 36 extending therefrom. For mounting each roller 28, the cutter head 10 has a slot 38 and a bore 40 openly communicating therewith which respectively retain the yoke 34 and shank 36 in a slidable manner. The roller 28 is urged toward the work surface 30 by the spring 42 that is disposed in the bore 40 to bear on the shank 36. The set screw 44 and groove 46 in the shank 36 cooperate to limit the movement of the shank 36 within the bore 40.

Between each blade 22 and roller 28 in the cutting path 26 is a brush 48. Each brush is secured in a keyway 50 in the face 12 of the cutter head 10 to project from the face. The keyways are provided at an angle to a radius of the cutter head 10 whereby the brushes 48 are obliquely disposed in the cutting path 26.

It is noted that the width of each burnishing roller 28 is greater than that of the cutting path 26 as defined by the width of the blades 22, and further, the width of each obliquely disposed brush 48 is greater than that of each roller 28. In operation the rotating blades 22 cut into a work surface 30 and the brush 48 that follows a given blade 22 sweeps the chips produced thereby to the outside of the cutting path 26. The following roller 28 then meets a work surface 30 that is substantially free of chips whereby the cut surface is burnished by the spring-mounted roller 28, all of which is performed in one operation.

It should be understood that the present disclosure is for the purpose of illustration only and that this invention includes all modifications and equivalents that fall within the scope of the appended claims.

I claim:

1. For cutting and burnishing a work surface, a tool comprising a rotary head having a driving shaft at one end and recesses distributed around the other end, radially disposed cutter blades projecting from recurrent recesses and radially disposed burnishing rollers mounted in intermediate recesses, and brushes that extend from said other end and each of which is obliquely disposed between one of said cutter blades and said roller that follows said blade.

2. A tool according to claim 1 wherein each of said rollers is tapered toward its inner end.

3. A tool according to claim 1 wherein each of said rollers is spring mounted in said head.

4. For cutting and burnishing a work surface, a tool comprising a rotary head having a driving shaft at one end and, distributed around the other end and projecting therefrom, radially disposed cutter blades and radially disposed burnishing rollers mounted intermediate the blades, and means between the cutter blades and burnishing rollers for removing the chips produced by the cutter blades in advance of the burnishing rollers.

References Cited by the Examiner

UNITED STATES PATENTS

| | | | |
|---|---|---|---|
| 1,300,325 | 4/1919 | Baumann | 77—58 |
| 1,501,690 | 7/1924 | Strong | 29—90 |
| 1,913,136 | 6/1933 | Wuerfel | 29—90 X |
| 2,056,706 | 10/1936 | Blazek | 29—90 |
| 2,247,887 | 7/1941 | Nascimbeni | 29—96 X |
| 2,254,674 | 9/1941 | Christman | 29—90 |
| 2,362,779 | 11/1944 | Stevens | 29—567 |
| 2,416,774 | 3/1947 | Rosenblatt | 29—567 |
| 2,453,797 | 11/1948 | Johnson | 29—90 X |
| 2,885,766 | 5/1959 | Ernst. | |
| 3,227,012 | 4/1966 | Lemelson | 77—65 |

WILLIAM W. DYER, JR., *Primary Examiner.*

HARRISON L. HINSON, *Examiner.*